Figure 1:
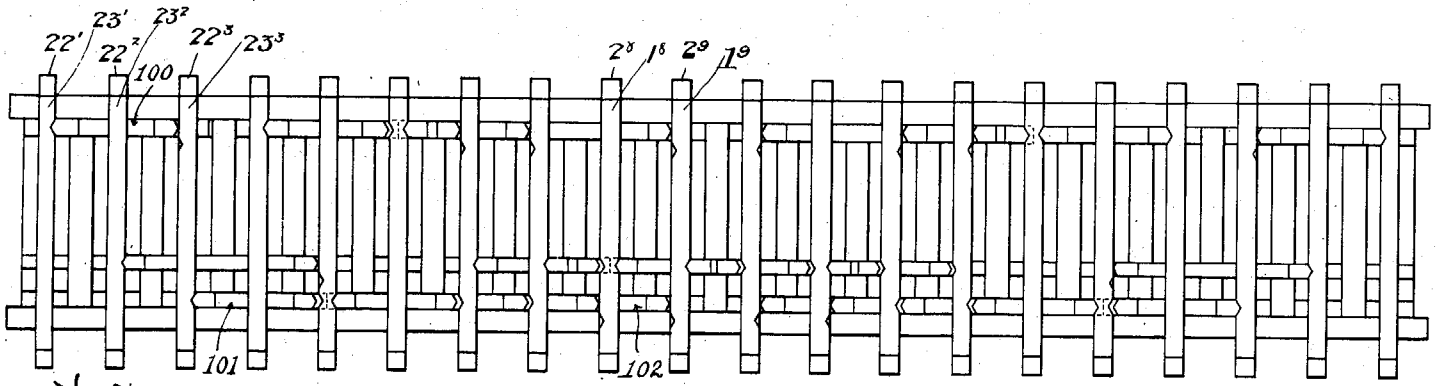

No. 11,983. Reissued May 6, 1902.

J. D. TAYLOR.

RAILWAY SIGNALING AND SWITCHING APPARATUS.

(Application filed May 29, 1901.)

7 Sheets—Sheet 1.

Witnesses:
M. E. Snyder.
A. W. Plumley

Inventor:
John D. Taylor,
by his Attorneys,
Macomber & Ellis.

No. 11,983. Reissued May 6, 1902.

J. D. TAYLOR.

RAILWAY SIGNALING AND SWITCHING APPARATUS.

(Application filed May 29, 1901.)

7 Sheets—Sheet 2.

Witnesses:
M. E. Snyder
A. W. Plumley

Inventor:
John D. Taylor.
by his Attorneys,
Macomber & Ellis.

No. 11,983. Reissued May 6, 1902.

J. D. TAYLOR.

RAILWAY SIGNALING AND SWITCHING APPARATUS.

(Application filed May 29, 1901.)

7 Sheets—Sheet 3.

Witnesses:
M. E. Snyder.
A. W. Plumley

Inventor:
John D. Taylor,
by his Attorneys,
Macomber & Ellis.

No. 11,983. Reissued May 6, 1902.

J. D. TAYLOR.

RAILWAY SIGNALING AND SWITCHING APPARATUS.

(Application filed May 29, 1901.)

7 Sheets—Sheet 4.

Witnesses:
M. E. Snyder.
A. W. Dimley

Inventor:
John D. Taylor,
by his Attorneys,
Macomber & Ellis.

No. 11,983. Reissued May 6, 1902.

J. D. TAYLOR.

RAILWAY SIGNALING AND SWITCHING APPARATUS.

(Application filed May 29, 1901.)

7 Sheets—Sheet 5.

Witnesses:
M. E. Snyder
A. W. Hunley

Inventor:
John D. Taylor,
by his Attorneys,
Macomber & Ellis.

No. 11,983. Reissued May 6, 1902.

J. D. TAYLOR.

RAILWAY SIGNALING AND SWITCHING APPARATUS.

(Application filed May 29, 1901.)

7 Sheets—Sheet 6.

Witnesses
M. E. Snyder
A. W. Plumley

Inventor
John D. Taylor,
by his Attorneys,
Macomber & Ellis

No. 11,983. Reissued May 6, 1902.

J. D. TAYLOR.

RAILWAY SIGNALING AND SWITCHING APPARATUS.

(Application filed May 29, 1901.)

7 Sheets—Sheet 7.

Witnesses:
M. E. Snyder.
A. W. Plumley.

Inventor:
John D. Taylor,
by his Attorneys,
Macomber & Ellis.

UNITED STATES PATENT OFFICE.

JOHN D. TAYLOR, OF BUFFALO, NEW YORK, ASSIGNOR TO TAYLOR SIGNAL COMPANY, A CORPORATION OF NEW YORK.

RAILWAY SIGNALING AND SWITCHING APPARATUS.

SPECIFICATION forming part of Reissued Letters Patent No. 11,983, dated May 6, 1902.

Original No. 605,359, dated June 7, 1898. Application for reissue filed May 29, 1901. Serial No. 62,433.

*To all whom it may concern:*

Be it known that I, JOHN D. TAYLOR, of Buffalo, New York, (formerly of Chillicothe, in the county of Ross and State of Ohio,) have invented new and useful Improvements in Railway Signaling and Switching Apparatus, of which the following is a full, clear, and exact description.

This invention relates to an improved apparatus for controlling the movements of signals and switches on a railway; and an object is to construct an interlocking or controlling apparatus having means for preventing a lever changing its position in either direction before the track-switch has made its complete movement.

The invention contemplates, in part, improvements upon my Patent No. 516,903, of March 20, 1894, and Patent No. 554,097, of February 4, 1896.

I will describe a railway signaling and switching apparatus embodying my invention and then point out the novel features in the appended claims.

Reference is had to the accompanying drawings, forming a part of this specification, in which similar characters of reference indicate corresponding parts in all views.

Figure 5:
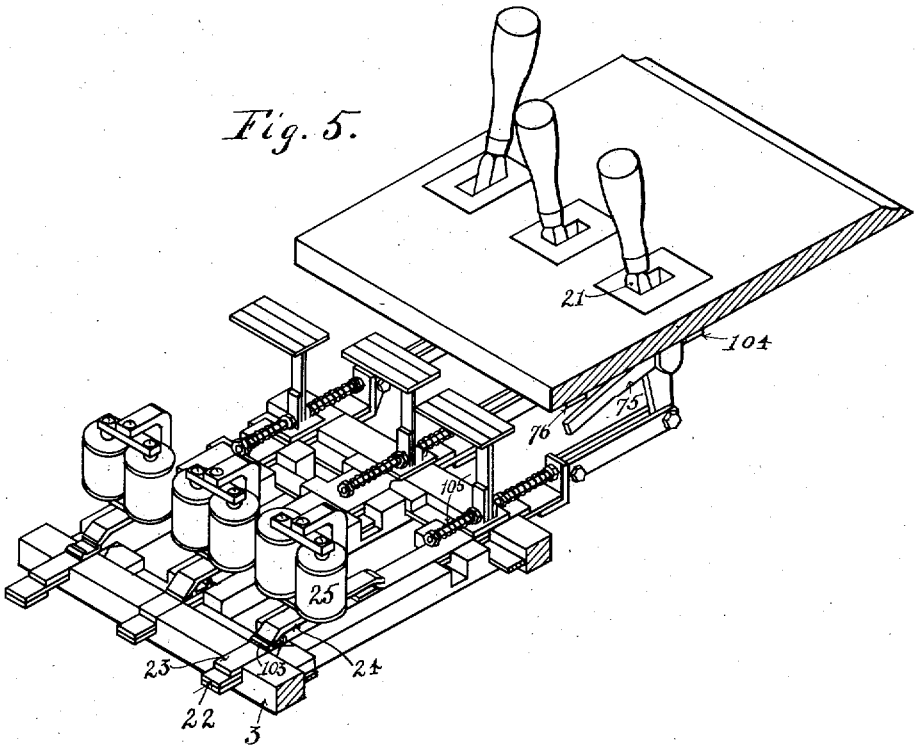
Figure 6:
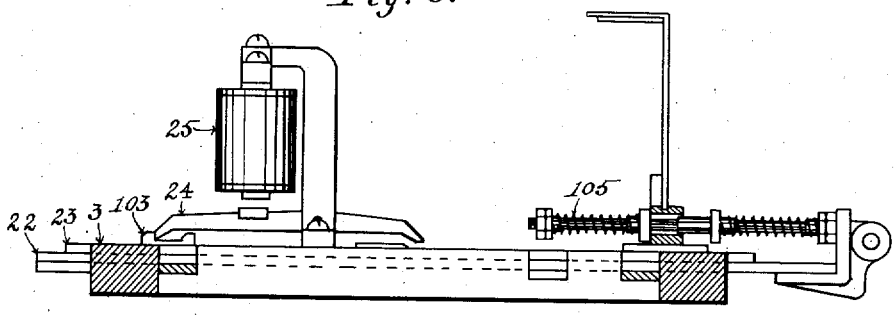
Figure 13:
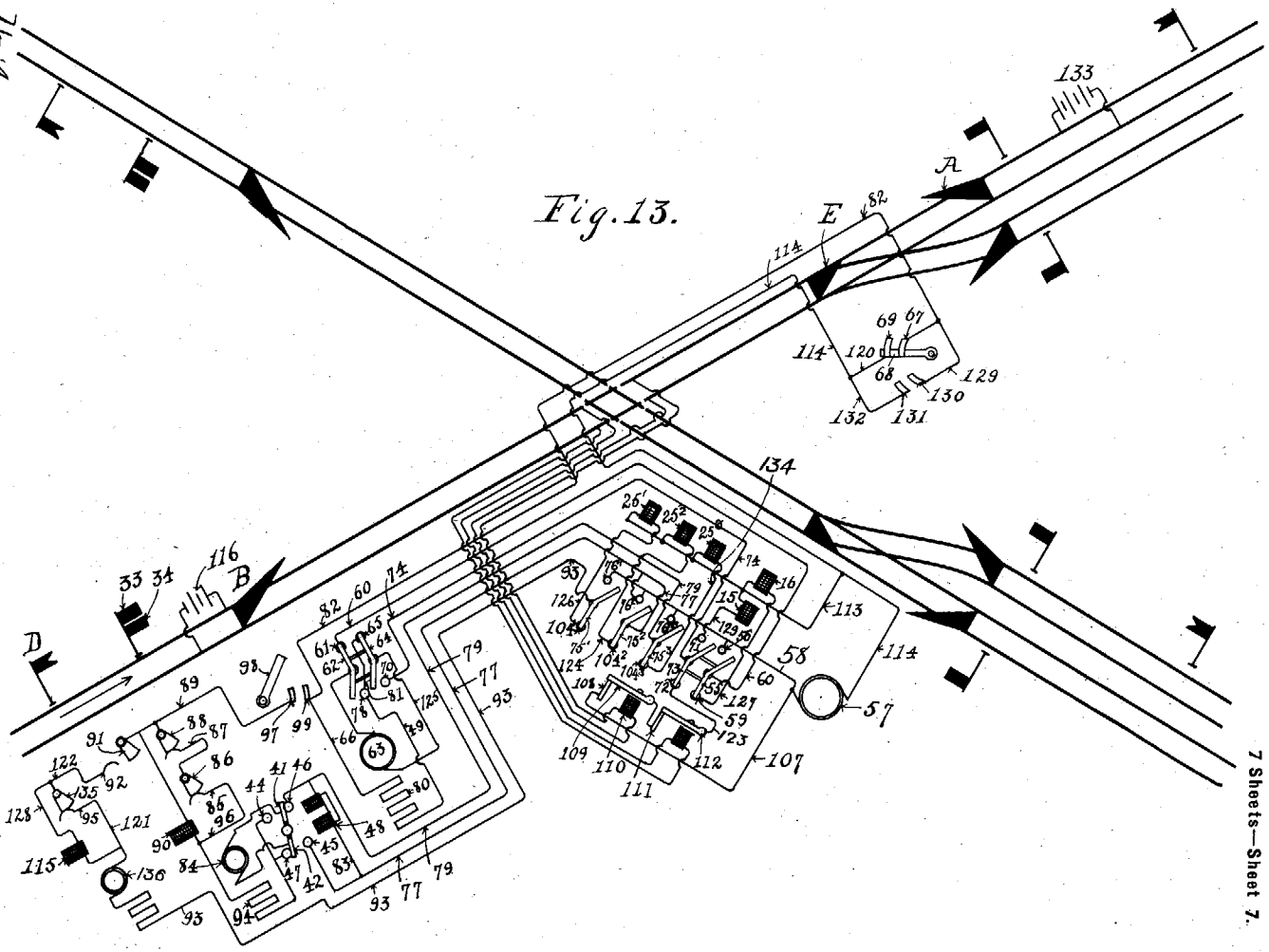

In some of the views, as Figures 1 and 13, where a series of like parts is shown and referred to, the reference character designating a part in the other views is used with indices to designate the like parts of the series—as, for example, the number 22 designates the signal-locking bar in Figs. 5 and 6, and the numbers $22'$ $22^2$ $22^3$ refer to like individual bars in the series shown in Fig. 1. The same remarks apply to Fig. 13 with reference to the series of signal-circuit controllers and contacts shown.

Figure 2:
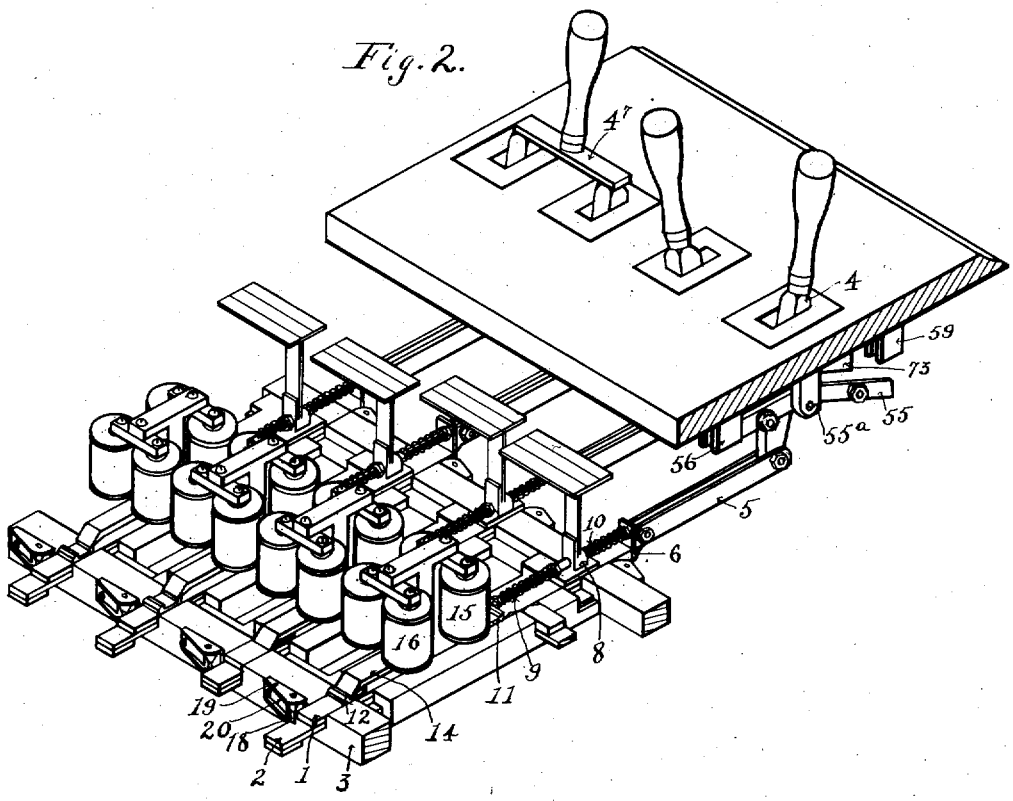
Figure 3:
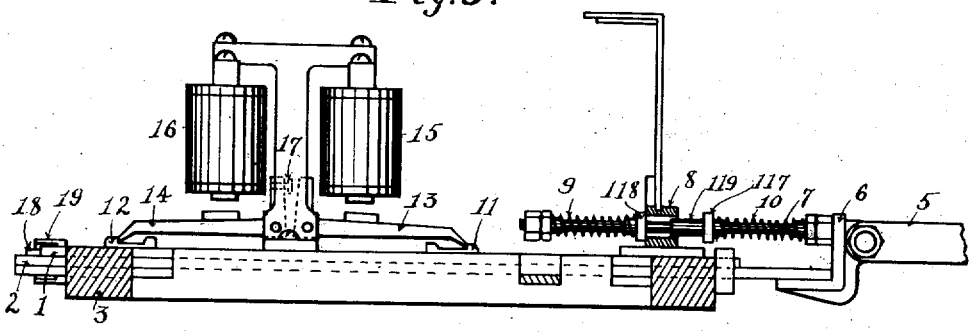
Figure 7:
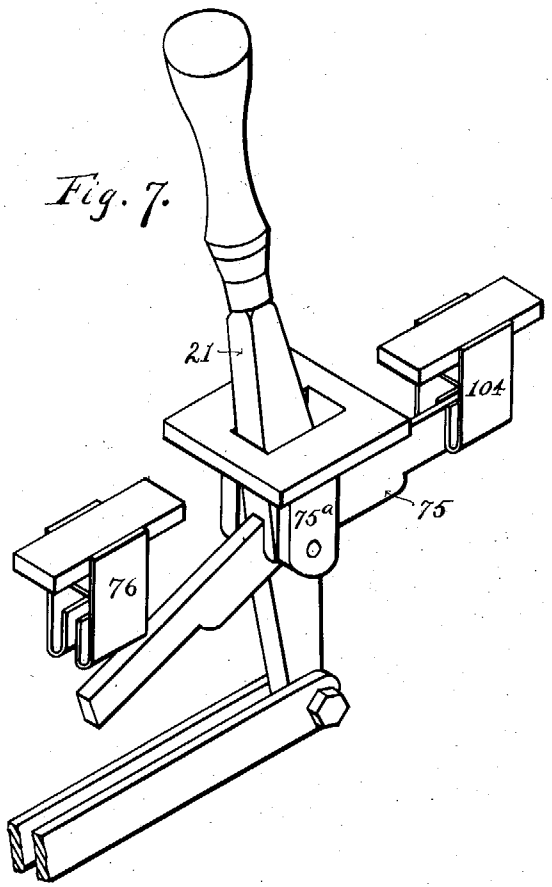
Figure 4:
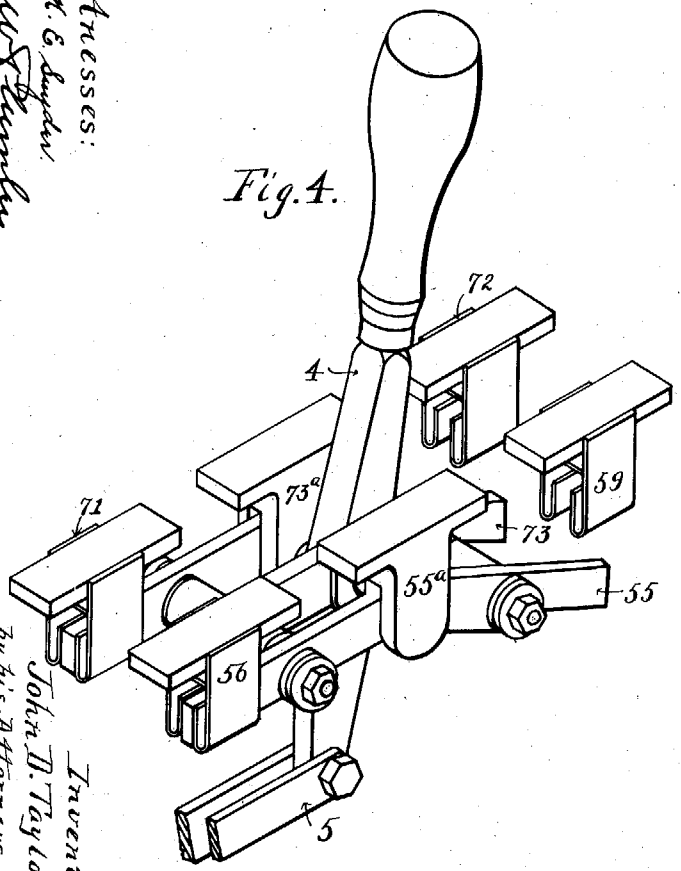
Figure 10:
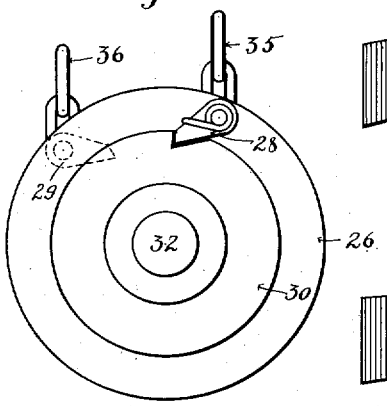
Figure 10:
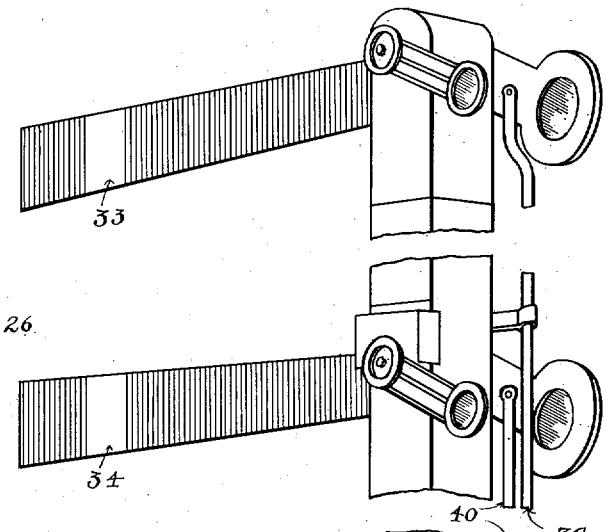
Figure 8:
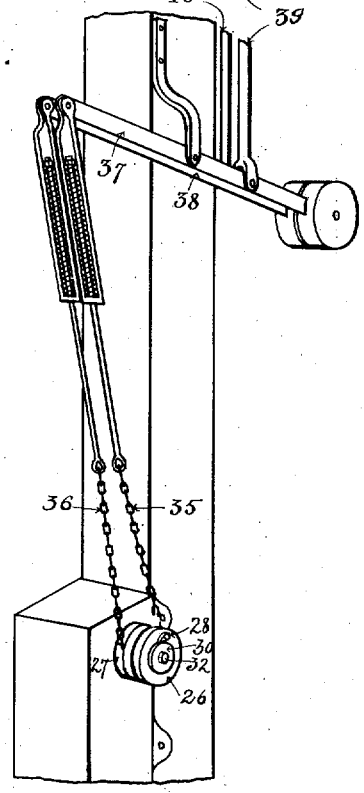
Figure 9:
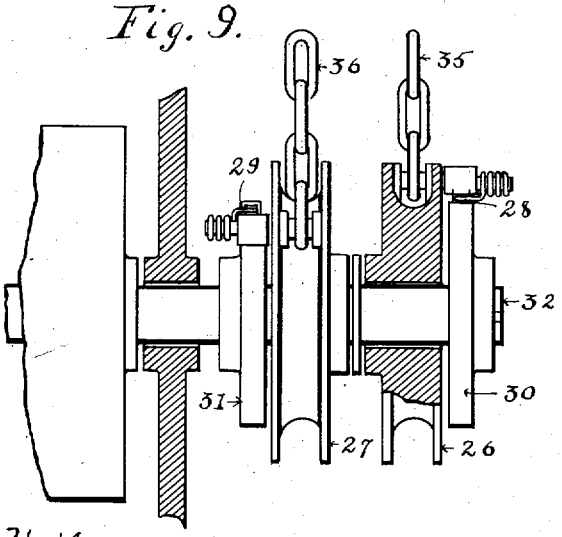
Figure 11:
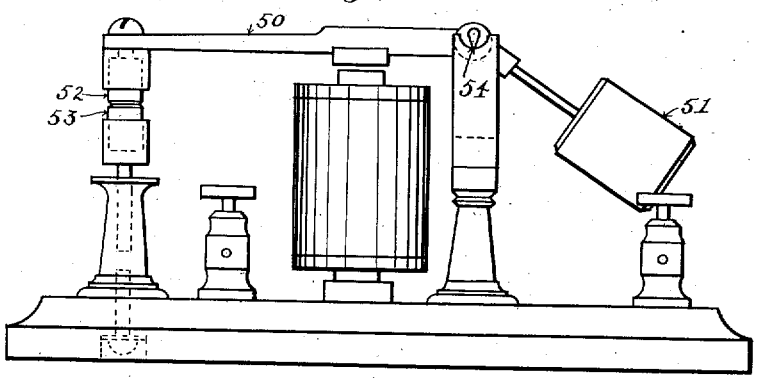
Figure 12:
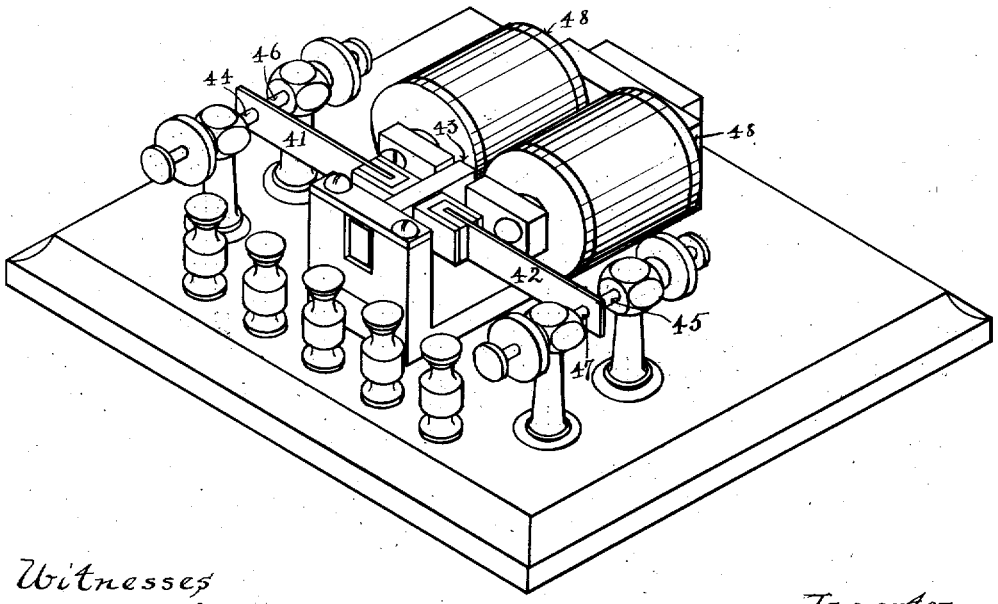

Fig. 1 is a plan view of the locking-bars employed in the switch-tower and showing how the transverse bars are interlocked with one another by longitudinal bars. Fig. 2 is a perspective view of a portion of the switch-controlling mechanism. Fig. 3 is an end elevation of a portion thereof. Fig. 4 is a detail perspective view of another portion thereof. Fig. 5 is a perspective view of a portion of the signal-controlling mechanism. Fig. 6 is an end elevation of a part of the same. Fig. 7 is a detail perspective view of a part thereof. Fig. 8 is a perspective view of the two-armed signal. Fig. 9 is a sectional view showing a clutch mechanism employed for operating the signal-arms. Fig. 10 is a side elevation of a chain-sheave employed. Fig. 11 is a side elevation of the track-circuit relay. Fig. 12 is a perspective view of the polarized pole-changing relay. Fig. 13 is a diagram of the tracks, switches, and signals and of the electric circuits.

Only one set of switches, signals, and circuits are shown on the drawings to avoid confusion; but it will be evident that the mechanisms and circuits controlling the other switches and signals would involve a substantial duplication of that shown and described.

In the interlocking apparatus which is placed in the signal-tower I employ in the switch-operating mechanism a series of secondary locking-bars, one for each function operated. Each of these bars 1 is mounted upon a primary locking-bar 2, and there is designed to be a relative movement between said bars 1 and 2. The several bars are mounted in a frame 3, and the bars 2 have connection with switch-levers 4. These switch-levers 4 have link connections 5 with lugs 6 on the inner ends of the bars 2. From the lugs 6 rods 7 pass loosely through openings in lugs 8, mounted on the bars 1. The portion movable within the opening in the lug 8 of each rod 7 is made somewhat larger than the remaining portion. The spring 9 bears at one end against a nut on the outer end of the rod 7 and at the other end against a collar 118, loose on the rod, and the spring 10 engages around the other end of the rod and abuts against the lug 6 and at the other end against a collar 117, loose on the rod. These springs 9 and 10 have a tendency to hold the bars 1 centrally over the bars 2.

Double-shouldered lugs 11 and 12 are secured to the upper sides of the bars 1 and are designed to be engaged by swinging latches 13 and 14, operated, respectively, by electromagnets 15 and 16. These latches 13 and 14 are provided with armatures coacting with the cores of the magnets, and they are pivotally connected to the uprights supporting the electromagnets. It will be here seen that the adjacent pivoted ends of the latches 13 and 14 are extended in an upward direction, and between the upper ends of these upwardly-disposed portions I place an adjusting-screw 17, (shown in broken lines in Fig. 3,) designed to destroy the effect of residual magnetism. These latches and lugs are so placed that they engage and hold the bar 1 when it has made one-half of its movement in either direction. The remaining part of the movement of the bar 2 compresses the spring 9 or 10, as the case may be.

Fig. 3 shows the bar 2 to have been changed from the reversed to normal position and now in the normal position. Its movement from reversed to normal tended through the spring connection to carry the bar 1 also from the reversed to normal position; but the latch 14 engaged the lug 12 when the bar 1 moved half-way from the reversed to the normal and stopped the movement of the bar 1. The bar 2 was, however, free to continue its movement as the spring connections between it and the bar 1 yield. The rod 7 is rigidly attached to the bar 2, but slides loosely through the hole in the lug 8. The sleeves 117 and 118 are also loose on the rod 7, so that the movement of the bar 2 toward normal position compresses the spring 9 after the bar 1 is stopped by the latch 14. The large part 119 of the rod 7 is thus partially withdrawn from the lug 8, and the pressure of the spring 9 is brought to bear on the lug 8 and through it pushes the bar 1 into normal position as soon as the latch 14 is lifted by the electro-magnet 16. The bar 1 in Fig. 3 is not in the normal position, but is stopped in the middle position by the latch 14. When both bars 1 and 2 are in either the normal or reversed positions, the large part 119 of the rod 7 is entirely inclosed by the lug 8.

In moving from normal to reversed positions the operations are the same except that the latch 13, lug 11, and spring 10 come into play instead of the parts 14, 12, and 9.

The reason why I permit a half movement of the bar 1 before it is stopped by the latch 14 is to put the indicator carried by the bar 1 in the neutral position—that is, neither normal nor reversed—whenever the switch-operating lever is changed from one position to the other. This indicator is described in my Patent No. 554,097. The indicator remains in this position until the track-switch makes its complete movement, as explained elsewhere.

By means of the set-screw 17, above mentioned, when one of the latches is raised the other is pushed down. This serves the purpose of destroying the effect of residual magnetism in the following manner: Suppose the magnet 15 to be energized and the latch 13 to be lifted. This releases the bar 1, which, under the influence of the spring 10, carries an elevated portion of the lug 12 under the point of the latch 14, lifting it, and through the set-screw 17 pushing the latch 13 away from the magnet 15 after the current through the magnet has ceased. This action is the same in either direction and is illustrated by the two central bars shown in Fig. 2, which are in complete normal and reverse position, respectively.

If the switch-operating lever 4 be placed in position to effect the movement of a track-switch and before the track-switch has made its complete movement it be changed from that position to the opposite position suddenly, the effect on the releasing-magnets 15 or 16, as the case may be, would be the same as though the track-switch had made its complete movement in the opposite direction to that in which it was moving at the time the current was cut off, and the locking-bar 1 would be released, permitting other movements which might be conflicting. To prevent this, a pawl 18 is pivoted to a bracket 19, attached to the frame 3, and the pawl is pressed into engagement with the bar 2 by means of a spring 20. A notch is cut in the edge of the bar 2, into which the pawl is designed to engage before the switch-operating lever 4 has moved far enough to break the circuit through the switch-operating motor and prevents reverse movement of the lever 4. When the track-switch completes its movement, the bar 1 is released and slides out past the point of the pawl 18 and the notch in the bar 2 and forces the pawl out of said notch, so that both bars are free to move. The switch-operating lever 4 can now be put in the other position. If an operator inadvertently tries to move the lever 4 too soon and the notch in the bar 2 is made to receive the pawl 18, the pressure on the pawl will prevent the complete movement of the bar 1, as the pawl will bear against the wall of the notch; but if the lever 4 be out into proper position and the pressure on the pawl removed the bar 1 will complete its movement. The pawls 18 are employed at each end of the bars 2, or rather at each side of the frame 3, to engage with opposite end portions of the bars.

In this application the switches and signals are worked by separate levers. The signal-operating levers 21 are connected to bars 22, which carry and are connected to bars 23 in the same manner that the bars 1 and 2 are connected to the switch-operating levers. The construction and operation of the bars 22 and 23 are similar to the bars 1 and 2 in all respects, except that the bar 23 is locked by a latch 24 in only one direction and that in moving toward the normal position corresponding to the "danger" position of the signal. The latch 24 is lifted at the proper time by the electromagnet 25, which is energized by a current generated in the armature of the signal-operating motor, which is caused to rotate by the falling of a counterweight, which places the signal in a normal position.

The manner of converting the signal-motor into a generator driven by the counterweight during its descent is described in my Patent No. 516,903, March 20, 1894; but in said patent the current is used for no other purpose than to retard the fall of the counterweight and prevent shock to the mechanism. In this application it is used both to retard the counterweight and to operate the releasing-magnet 25. It is unnecessary to lock the bar 23 by a latch when moving toward the reverse position, because the signal is the last thing that is to be reversed, nothing afterward depending on its making a complete movement in that direction. Of course the distant signals must not be reversed until after the home signal is completely reversed; but this is secured by passing the distant-signal circuit through a circuit-closer operated by the home signal.

The mechanism for operating the double signal, Figs. 8, 9, and 10, is similar to that for operating a single signal described in my Patent No. 516,903, except that instead of one chain-sheave keyed to the shaft there are two chain-sheaves 26 and 27, placed loosely on the shaft and carrying spring-pressed pawls 28 and 29, which engage teeth in the ratchet-wheels 30 and 31, respectively. The ratchet-wheels 30 and 31 each have only one tooth, and these and the pawls are so arranged that the tooth on the wheel 30 engages the pawl 28 when moving in one direction, and the tooth on the wheel 31 engages the pawl 29 when running in the opposite direction. The ratchet-wheels 30 and 31 are keyed to the shaft 32 of the signal-operating mechanism and rotate with it in one direction or the other, depending upon the rotation of the motor-armature. The parts are so proportioned that less than one revolution of the ratchet-wheel 30 is sufficient to effect the reversal of the signal-arm. This is necessary, because if more than one revolution were required the tooth of the other ratchet-wheel would pass its pawl. Then when the first signal returns to its normal position the other pawl would catch and tend to reverse the other signal.

If it is desired to reverse the signal-arm 33, the signal-operating motor is run in such direction that the ratchet-wheel 30 engages the pawl 28 and causes the chain-sheave 26 to rotate with it. At the same time the pawl 29 slides easily over the periphery of the ratchet-wheel 31 and has no effect on the signal 34. If the motor is run in the opposite direction, the ratchet-wheel 31 engages the pawl 29 and the pawl 28 slides easily over the ratchet-wheel 30 and the signal 34 is reversed. The signals 33 and 34 will be operated by the winding of the chains 35 and 36 on the sheaves 26 and 27, thus moving the pivoted levers 37 and 38 and moving the rods 39 and 40, which connect with the signals 33 and 34.

The instrument which effects the reversal of the signal-operating motor is shown in Fig. 12. It is similar to the well-known polarized relay, except that it has two contact-tongues 41 and 42, each of which can make contact with either of two contact-posts. The tongues 41 and 42 are attached to the armature-lever 43, but insulated electrically therefrom and from each other. In one position of the lever 43 the tongue 41 makes contact with the contact-point 44 and the tongue 42 makes contact with the point 45. In the other position of the lever 43 the tongue 41 makes contact with a point 46 and the tongue 42 makes contact with the point 47. Of course the armature-lever 43 will be swung laterally to make the above-mentioned contacts by means of the electromagnet 48.

In the track-circuit relay shown in Fig. 11 the armature-lever 50 is retracted by a weight 51. There is no objection to the weight on account of the slowness of its action, as rapid action of the armature is not required in a relay used for this purpose, and it has the following great advantage over a spring when the relay is used for the purpose herein described. A weight when suspended from a horizontal axis and free to move about that axis will tend to place itself in such position that its center of gravity is vertically below the axis, and the force required to push it out of its position will be zero at the start, but will increase proportionally to the sine of the angle which a line passing through the center of gravity and the axis makes with the vertical, and the actual force at any point will equal the weight multiplied by the sine of the angle. Applying the weight to the relay-armature, as shown in the drawings, the weight will be partially counterbalanced by the armature-lever. This will cause the weight to hang at some point between the vertical and horizontal, and the force required to move it will be equal to the weight multiplied by the sine of the angle which the line passing through its center of gravity and the axis makes with the vertical, less the counterbalancing effect of the armature. The weight may be so adjusted as to size and relative position with respect to the armature that the separation of the contacts 52 and 53 may be any amount desired, and still the force required to draw the armature down will be so small that any ordinary battery used in track-circuit work will exert sufficient force. A wide separation of the contacts 52 and 53 is useful in working on high-potential circuits in order to break the arc formed. The armature-lever has knife-edged bearings 54.

To more clearly illustrate the functions of the mechanism described above, I will describe the operation of one of each of the different kinds, using the diagram of Fig. 13. The normal position of all derails is open, the normal position of the transfer-switches is set for the main track, and the normal position of all signals is at "danger." In Fig. 13 everything is shown in normal position. Suppose it is desired to give a clear track to a train traveling in the direction of the arrow shown in Fig. 13. Derails A and B must first be reversed or closed. I will describe the operation of the derail B only, as they are alike.

First, the proper lever—say lever 4—is to be reversed. This pushes its bar 2 forward into reversed position and carries its bar 1 halfway, where it is stopped by the lug 11 engaging with the latch 13, where it remains until the track-switch completes its movement. The reversal of the lever 4 also puts an electric switch-arm 55 in contact with the contact-fingers 56. This closes the circuit of the generator 57, so that the current flows through the wire 58, contact-fingers 56, switch-arm 55, wire 60, contact 61, switch-arm 62, armature of motor 63, wire 125, switch-arm 64, contact 65, wires 81 and 49, field 80 of the motor 63, wire 66, wire 82, contact 67, bar 68, contact 69, wire 120, and wire 114, back to the generator 57. This rotates the armature of the motor 63, closes and locks the rail-switch, and reverses the pole-changing switch 64 62 to produce the back indication, as described in my Patent No. 544,097, February 4, 1896. The reversal of this pole-changing switch breaks the circuit last above named and forms a new one, including the motor 63 and magnet 15 belonging to this particular derail, so that the current generated in the armature of the motor 63 by its rotation due to acquired momentum flows from the armature of the motor 63 through the switch-arm 62, contact 78, wire 49, fields 80 of the motor 63, wire 66, wire 82, contact 67, bar 68, contact 69, wires 120 and 114, wire 113, magnet 15, wire 129, contact 71, switch-arm 73, (the switch-arm 73 having been put into connection with the contact 71 by the movement of lever 4, mentioned above,) wire 74, contact 70, and switch-arm 64 and wire 125, back to the armature of the motor 63. This induced current serves a double purpose—that is, it serves to stop the rotation of the armature of the motor 63 and also serves to energize the magnet 15, which lifts the latch 13 and releases the bar 1, which under the influence of the spring 10 takes the reverse position. The bars 1 and 2 and the corresponding bars connected to the lever controlling the derail A being reversed release the signal-lever 21, which operates the signal 33, governing this route. The reversal or closing of the track-switch B places the contact-bar 98 in position to make electrical connection between the contacts 97 and 99, as explained in my Patent No. 554,097. Signal 33 is the one to reverse or clear for a train going in the direction indicated by the arrow. To do this, the signal-lever 21 is reversed. This puts the bar 22 and the bar 23 in the position shown at the left in Fig. 5 and puts the electric switch-arm $75^2$, carried by the lever 21, in contact with a contact-piece $76^2$. This closes the circuit of the generator 57, so that the current flows through the wire 58, contact $76^2$, switch-arm $75^2$, wire 77, wire 83, magnet of polarized relay 48, wire 79, switch-arm $75^3$, contact $104^3$, wire 134, magnet $25^3$, and wires 113 and 114, back to the generator 57. This energizes the electromagnet of the polarized relay 48 and throws the armature 43 against either one of the magnetic poles, depending upon the direction of the current in the magnet-coil and the polarity of the permanent magnet. This deflection can be made right, if wrong, by reversing the connections on the terminals of magnet 48. After being once made right they need never after be changed. The current flowing in the above-named circuit will put the tongue 41 in contact with the contact-point 44 and the tongue 42 in contact with the contact-point 45. This closes another circuit of the generator 57, so that the current flows through the wire 58, contact $76^2$, switch-arm $75^2$, wire 77, contact 45, tongue 42, armature of motor 84, tongue 41, contact 44, field 94 of motor 84, wire 96, brush 85, rotary switch-arm 86, brush 87, rotary switch-arm 88, wire 89, contact 97, bar 98, contact 99, wire 82, contact 67, bar 68, contact 69, and wires 120 and 114, back to the generator 57. This energizes the motor, causing the ratchet-wheel 30 to rotate, so as to engage the pawl 28 to rotate the chain-sheave 26. This puts the signal-arm 33 into reversed or "safety" position. The circuit is broken by the separation of the rotary switch-arm 88 and the brush 87 and maintained through the brake-magnet 90, as explained in my Patent No. 516,903. In this position of the signal 33 the rotary switch-arm 91 makes contact with the brush 92, and if now the signal-operating lever corresponding to distant signal D be reversed the circuit is established, so that the current flows from the generator 57 through the wire 58, contact 76′, switch-arm 75′, wire 93, motor 136, wire 121, brush 95, rotary switch-arm 135, wire 122, brush 92, rotary switch-arm 91, wire 89, contact 97, bar 98, contact 99, wire 82, contact 67, wire 68, contact 69, and wires 120 and 114, back to the generator 57. This reverses the distant signal D. The reversal of the distant signal D rotates the switch-arm 135 out of contact with the contact-spring 95, thus shunting the current leaving the motor 136, so that it passes through the magnet 115 and wire 128. The energizing of the magnet 115 holds the arm of the signal D to "safety" so long as the current is maintained through the shunt-circuit just described. The fall of the counterweight of the signal D when said circuit is broken will again put the switch-arm 135 and the contact-spring 95 in contact for establishing the circuit for the back-indication current and for the next movement of the signal. The locking-bars 22′ and 23′, Fig. 1, connected to the lever which controls the distant signal D, are in the position shown at the left-hand side of Fig. 5 when this signal is reversed. This reversed position of the bars 22′ and 23′ locks the bars $22^3$ and $23^3$, connected to the lever controlling the home signal 33, through the longitudinal bar 100, as shown in Fig. 1. The reversed position of the bars $22^3$ and $23^3$ locks the bars $1^8$ and $2^8$, attached to the switch-levers controlling derail B, and also the bars $1^9$ and $2^9$, attached to the switch-lever controlling derail A, in the reverse position through the longitudinal bars 101 and 102. In putting the different parts back into normal position the first thing to be operated is the distant signal D. When the lever controlling this signal is put into normal position, its locking-bar 22′ is drawn back to the normal position; but the locking-bar 23′ is stopped half-way by the latch 24 catching on the lug 103, secured to the bar 23′. The switch-arm 75 will be separated from the contact 76 and put into contact with the contact-plate 104. This interrupts the current through the brake-magnet 115, as above described, and allows the signal to assume a normal position under the influence of its counterweighted levers, and this closes another circuit, so that the current generated by the motor-armature 136, driven by the descending counterweight, flows through the brush 95, rotary switch-arm 135, wire 122, brush 92, switch-arm 91, wire 89, contact 97, bar 98, contact 99, wire 82, contact 67, bar 68, contact 69, wires 120, 114, and 113, magnet 25′, wire 126, contact 104′, switch-arm 75′, and wire 93, back to the motor 136. This current retards the fall of the counterweight and energizes the magnet 25′, causing it to lift the latch 24, releasing the locking-bar 23′, which impelled by the spring 105 returns to normal position. This releases the locking-bars $22^3$ and $23^3$ and the home-signal-operating lever 21. If now the home-signal-operating lever 21 is put back to its normal position, its bar $22^3$ is drawn back to normal position, but its bar $23^3$ is stopped half-way by the latch 24. This movement of the home-signal lever 21 also separates the electric switch-arm $75^2$ from the contact $76^2$ and puts said switch-arm $75^2$ into contact with the contact-plate $104^2$. This breaks the circuit through the brake-magnet 90, releasing the signal 33, and as soon as the signal moves far enough to put the rotary switch-arm 88 into contact with the brush 87 establishes a new circuit, so that the current generated by the motor 84 flows through the tongue 41, contact 44, field 94 of the motor 84, wire 96, brush 85, rotary switch 86, brush 87, rotary switch-arm 88, wire 89, contact 97, bar 98, contact 99, wire 82, contact 67, bar 68, contact 69, wires 120, 114, and 113, magnet $25^2$, wire 124, contact $104^2$, switch-arm $75^2$, wire 77, contact 45, tongue 42, back to motor 84. This energizes the magnet $25^2$, releasing the locking-bar $23^3$ and allowing it to go to its normal position. This releases the locking-bars $1^8$ and $1^9$ and the levers controlling derails A and B. The derails A and B can now be restored to normal position; but I will describe the operation of only one, B, as they are alike. Putting the switch-operating lever 4 into normal position draws the bar $2^8$ back to normal position; but the bar $1^8$ is stopped half-way by the latch 14. It also puts the electric switch-arm 55 into contact with the contact-fingers 59 instead of the fingers 56 and the switch-arm 73 into contact with its contact-plate 72. This closes a circuit of the generator 57, so that the current flows through the wire 107, post 108, and lever 109 of the track-relay 110, post 111, and lever 112 of the next track-relay, wire 123, contact 72, switch-arm 73, wire 74, contact 70, switch-arm 64, wire 125, armature of motor 63, switch-arm 62, contact 78, wire 49, field 80 of motor 63, wires 66 and 82, contact 67, bar 68, contact 69, and wires 120 and 114, back to the generator 57. This current has the effect of opening the rail-switch B—that is, putting it in normal position—while at the completion of this movement the pole-changing switch is reversed, breaking contact with other contact-pieces. This interrupts the current from the generator 57 and makes a new circuit, so that the current generated by the rotation of the armature 63 flows through the wire 125, switch-arm 64, contact 65, wires 81 and 49, the field 80 of the motor 63, wires 66 and 82, contact 67, bar 68, contact 69, wires 120 114 113, magnet 16, wire 127, contact 59, switch-arm 55, wire 60, contact 61, and switch-arm 62 back to the motor 63. This energizes the electro-magnet 16 and lifts its latch 14, releasing the locking-bar $1^8$ to return to a normal position, actuated by its spring. This releases the switch-operating levers controlling switches on opposite routes.

The locking between the bars connected to the switch and signal levers (shown in Fig. 1) is similar to that employed in the well-known mechanical interlocking—that is, it is effected by means of pointed dogs attached to longitudinal locking-bars engaging notches in the transverse locking-bars connected to the operating-levers. The notches in the secondary or spring-connected bars coincide with the notches in the primary or rigidly-connected bars when these bars are normally situated with reference to each other. When the primary or rigidly-connected bar is in either extreme position and the secondary or spring-connected bar is held in the middle position by a latch, the notches do not coincide, and the two bars together, so far as the locking is concerned, are equivalent to a single bar without notches. The movement of the primary bar effects the locking of other levers, which locking is held by the secondary bar until the function controlled by the lever connected thereto has returned to its original position.

It will be noticed that the circuit which opens the derail passes through the contacts of the track-relay 110 and the next one to it. The magnets of these relays are energized by currents derived from the track-batteries 116 and 133 and through the track-rails. When a train is on any portion of the track between said batteries, the current will be shunted and cut off from one or both of the relays and their contacts will be separated, opening the circuit, which conveys currents for opening the track-switch. This prevents opening the track-switch under the train.

Certain of the switch-operating levers 4 are connected mechanically together in pairs, as shown at $4^7$ in Fig. 2. When derailing-switch B is closed, the bar 98, connected mechanically to the switch-rail, bridges the contact-pieces 99 and 97. When the switch E is set for the main track, the bar 68, connected mechanically to the switch-rail, bridges contacts 67 and 69, and when set for side tracks the bar 68 bridges the contacts 130 and 131. By reversing the lever controlling signal 34 the electric current is put through the switch-arm $75^3$ and the contact-plate $76^3$, closing the circuit of the generator 57, so that the current flows through the wire 58, contact $76^3$, switch-arm $75^3$, wire 79, magnet 48 of polarized relay, wires 83 77, switch-arm $75^2$, contact $104^2$, wire 124, magnet $25^2$, wire 113, wire 114, back to the generator 57. This current passes through the magnet 48 in the opposite direction to that sent through it when the lever operating signal 33 was reversed. The lever 43 is thrown to the other side, and the tongues 41 and 42 make contact with contacts 46 and 47, respectively. This closes another circuit of the generator 57, so that the current flows through the wire 58, contact $76^3$, switch-arm $75^3$, wire 79, contact 46, tongue 41, armature of the motor 84, tongue 42, contact 47, the fields 94 of the motor 84, wire 96, brush 85, rotary switch 86, brush 87, rotary switch 88, wire 89, contact 97, bar 98, contact 99, wires 82 and 129, contact 130, bar 68, contact 131, and wires 132 and 114 back to the generator 57. This current flows through the armature of the motor 84 in the opposite direction to that sent through it when the lever operating signal 33 was reversed. This rotates the ratchet-wheels 30 and 31 in the opposite directions, causing the ratchet-wheel 31 to engage the pawl 29, the ratchet-wheel 30 remaining inoperative. This brings the signal 34 into safety position. Putting the lever operating signal 34 back into normal position releases signal 34, which, returning to normal position, generates the current that releases the locking-bar $23^4$ in the same manner as before described for 33.

When the lever 43 of the polarized relay is thrown to either side, it remains there on account of the attraction of the permanent magnet until a current is sent through the electromagnet in the opposite direction. The current which energizes the magnet 48 of the polarized relay when signal 33 is to be operated passes through the magnet $25^3$, and when the signal 34 is to be operated it passes through the magnet $25^2$; but this has no effect, as the locking-bar under the magnet through which a current is passing must be necessarily in a normal position.

To more fully describe the operation of the pawl 18 in connection with the notch in bar 2, I will describe a specific movement of the switch-operating lever 4. The lever 4 (see Fig. 2) and the bar 2, connected thereto, have just been moved from the normal to the reversed positions for the purpose of closing or reversing the track-switch operated thereby and for locking levers controlling switches on opposing routes. During the rotation of the motor which effects the reversal of the track-switch the bar 1 is held in the middle position by the latch 13 engaging with the lug 11, which stops it when it has made one-half its movement—in this case from the normal to the reversed position—in consequence of which the spring 10 is compressed by the continued movement of the bar 2. The complete movement of the bar 2 will carry the notch in its edge past the front of the pawl 18. If now while the bar 1 is held in the middle position the operator should attempt to put the lever 4 and the circuit-closers and the bar 2, connected to it, into the normal position again, the movement would be prevented by the pawl 18 engaging the notch in the bar 2; but when the track-switch is completely reversed the current generated by the switch-operating armature, described elsewhere in the specification, also in my Patent No. 554,097, circulates in the coils of the magnet 15, causing it to lift the latch 13, thus releasing the bar 1, which under the influence of the spring 10 moves to a complete reversed position. In this position of the bar 1 it covers the notch in the bar 2 and holds the pawl 18 away from engagement with the notch, so that it will not prevent the movement of the bar 2 back to normal position.

In Fig. 2 the bar 2 is shown in its reversed position, in Fig. 3 it is shown in its normal position, while in both figures the bar 1 is shown in the middle position. If it were not for the pawl 18, the operator could change the position of a switch-operating lever while the switch-operating motor was still running—that is, before the track-switch is completely opened or closed, as the case may be—thereby cutting off the current from the generator to the motor and closing the independent motor-circuit, and thereby releasing magnet 15 or 16, the current energizing the releasing-magnet in this case being due to the induction in the motor field-coils following the cessation of the magnetizing-current.

The transverse bars shown in Fig. 1 are the transverse bars of Figs. 2 and 5, the lower ones being connected to and operated by the switch-levers. The bars 2 and 22 are the same as those shown in Fig. 4 of my Patent No. 554,097, and the bars 100, 101, and 102 operate similarly to the bars *a* of my patent above referred to.

In Figs. 4 and 7 I show the several contacts in their true position. The wires in practice are connected to the metal blocks 56, 59, 71, and 72, which support the contact springs or fingers, and the metal supports 55ᵃ and 73ᵃ, which support the bars 55 and 73. In the normal position of the lever 4 the bar 55 bridges 55ᵃ and 59, and 73 bridges 73ᵃ and 72, and in the reversed position 55 bridges 55ᵃ and 56, and 73 bridges 73ᵃ and 71. In the normal position of the lever 21 the bar 75 bridges 75ᵃ and 104, and when reversed it bridges 75ᵃ and 76.

The switch 91 engages 92 when the home signal, to which it is attached, is in a safety or reversed position, thus permitting the current to reach the distant signal only when the home signal is in a safety position. The bar 98 bridges 97 and the corresponding contact 99 when the track-switch is closed or reversed, so as to permit the current to reach the signals governing the movements on that track only when the switch is in a proper position.

For the purpose of clearness in the claims I will term the locking-bar 2 as a "primary" locking-bar and the locking-bar 1 as a "secondary" locking-bar.

Having thus described my invention, I claim as new and desire to secure by Letters Patent—

1. In a railway signaling and switching apparatus, a series of operating-levers, primary and secondary locking-bars, connections between the primary bars and levers, yielding connections between the primary and secondary bars, holding-latches for the secondary bars, and electrical means for releasing the latches, substantially as and for the purposes set forth.

2. In a railway signaling and switching apparatus, a series of operating-levers, primary and secondary locking-bars arranged in pairs, one upon the other, connections between the primary bars and levers, spring-yielding connections between the pairs of bars, and electrically-actuated locking devices for the secondary bars, substantially as specified.

3. In a railway switching apparatus, a series of operating-levers, primary and secondary locking-bars, arranged in pairs, one upon the other, link connections between the primary bars and levers, spring-yielding connections between the primary and secondary bars, two latches for controlling the opposite movements of each secondary bar, spring-pressed pawls, one at each end of each primary bar, adapted to engage notches in the primary bars, and hold said primary bars until released by the secondary bars, and electromagnetic means for lifting the latches and releasing the secondary bars, substantially as specified.

4. A railway switching mechanism, comprising operating-levers, primary and secondary locking-bars, link connections between the primary bars and levers, spring-yielding connections between the primary and secondary bars, holding-latches for the secondary bars, electromagnets for raising the latches, and a switch-operating motor, by means of which the magnets are energized at the proper time by currents generated by the rotation of the switch-motor momentum, substantially as specified.

5. In a railway-switch-operating mechanism, a series of operating-levers, circuit-closers carried by the levers, primary and secondary locking-bars, link connections between the primary bars and levers, spring-yielding connections between the primary and secondary bars, holding-latches for the secondary bars, spring-pressed pawls for holding the primary bars until the secondary have made complete movement, electromagnets for lifting the latches and electric circuits comprising the switch-operating motor, an automatic electric reversing-switch operated by the motor, the circuit-closers attached to the operating-levers, the electromagnets and electrical connections, substantially as specified.

6. In a railway signaling apparatus, a signal, a motor for reversing the same, a counterbalanced lever for restoring the signal to its normal position, and rotating the motor in the reverse direction, a signal-operating lever, a two-position circuit-closer attached to the lever, a primary locking-bar, a secondary locking-bar, a link connection between the primary bar and lever, a spring-yielding connection between the two bars, a latch for controlling the movement of the secondary bar, and an electromagnet for raising said latch, the said magnet being in a circuit leading from the motor and energized by the current generated by the reverse rotation of the motor, substantially as specified.

7. In a railway signaling apparatus, two semaphores or signals, a motor, sheaves loosely mounted on the shaft of the motor, a clutch mechanism, between said shaft and the sheaves, the said clutch mechanism operating to rotate the sheaves in opposite directions when the motor is reversed, and connection between said sheaves and semaphores or signals, substantially as specified.

8. A railway-signal, comprising two swinging signals, a motor for operating the same, two sheaves loosely mounted on the shaft of the motor, a single-tooth ratchet-wheel, arranged at one side of each sheave, pawls carried by the sheaves for engaging the said teeth, counterbalanced levers on the support for the signals, connections between the sheaves and levers, and connections between the levers and signals, substantially as specified.

9. In a railway-signal-operating mechanism, two semaphores or signals, a reversal electric motor for operating the signals, a clutch mechanism on the shaft of the motor for selecting either one or the other signal, depending on the direction of rotation of the motor, a polarized pole-changing relay for determining the direction of the current through the motor-armature, a two-position circuit-closer, attached to each of the two signal-operating levers, one for each signal, said circuit-closers acting conjointly to control the circuit through the polarized relay and severally to control circuits through the motor, a generator and the electrical connections, substantially as specified.

In testimony whereof I have signed my name to this specification in the presence of two subscribing witnesses.

JOHN D. TAYLOR.

Witnesses:

M. E. SNYDER,

EDWARD C. HARD.